Oct. 20, 1970  P. V. FAGAN  3,535,125
PROCESS FOR THE MANUFACTURE OF EDIBLE COLLAGEN CASINGS
Filed Sept. 16, 1968  3 Sheets-Sheet 3

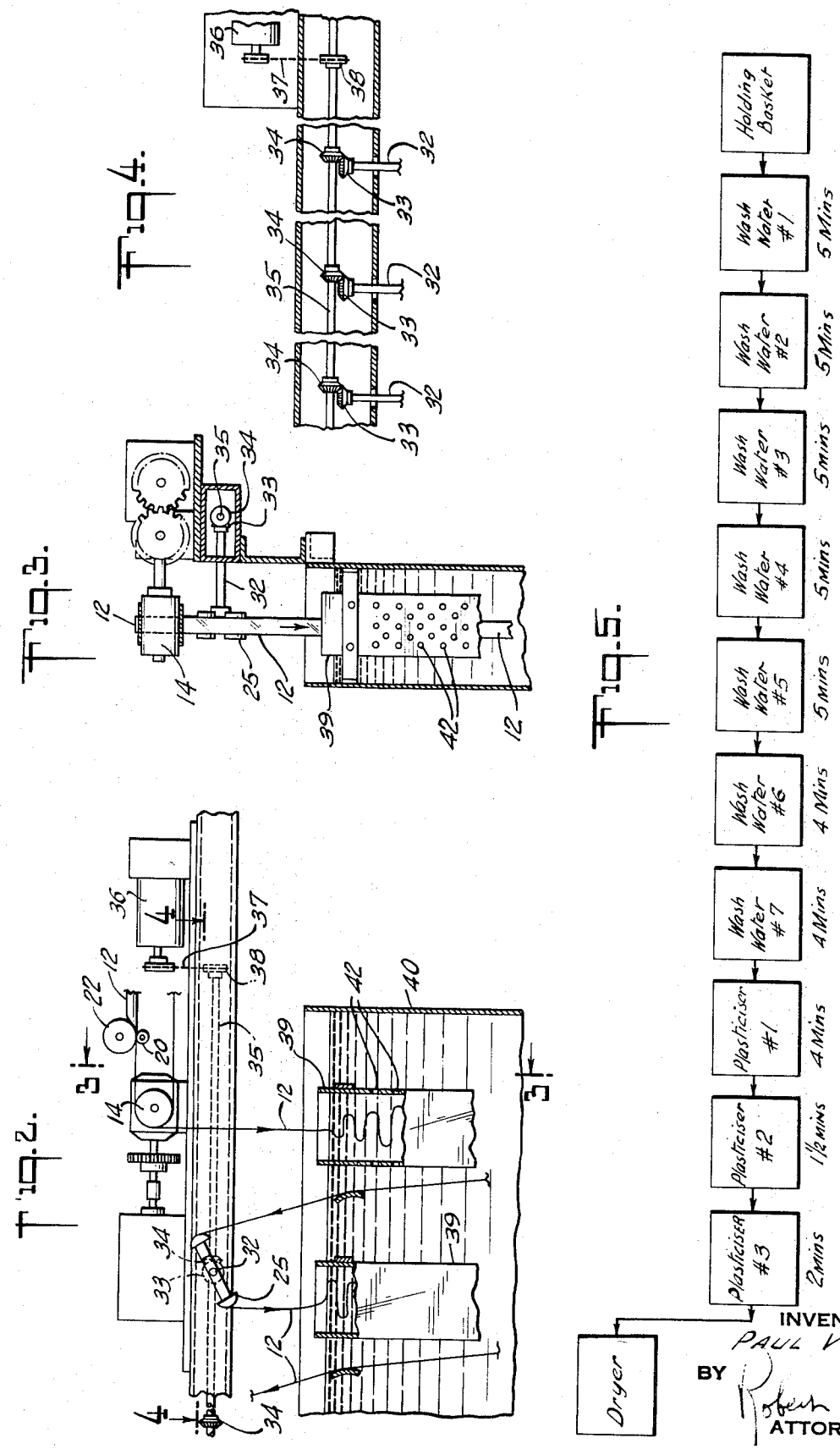

INVENTOR
PAUL V. FAGAN
BY
ATTORNEY

United States Patent Office 3,535,125
Patented Oct. 20, 1970

3,535,125
PROCESS FOR THE MANUFACTURE OF
EDIBLE COLLAGEN CASINGS
Paul V. Fagan, Somerville, N.J., assignor, by mesne assignments, to Devro, Inc., Somerville, N.J., a corporation of New Jersey
Continuation-in-part of application Ser. No. 670,998, Sept. 27, 1967. This application Sept. 16, 1968, Ser. No. 759,931
Int. Cl. A22c 13/00; B29d 23/04
U.S. Cl. 99—176
8 Claims

ABSTRACT OF THE DISCLOSURE

Edible collagen casings are manufactured by extruding a homogeneous mixture of acid-swollen collagen fibrils into an ammonia atmosphere to form a tube. The tube is inflated as it is formed with a mixture of air and ammonia gas which permeates the walls of the tube neutralizing the acid that is present in the collagen mass and increasing the tensile strength of the tube. The collagen tube is washed with water, plasticized and dried.

BACKGROUND OF THE INVENTION

This application is a continuation in part of my co-pending application Ser. No. 670,998, filed Sept. 27, 1967 now abandoned. This invention relates to a new and useful method and apparatus for the manufacture of an edible collagen tube by continuous extrusion and more specifically is an improvement of the method described in the U.S. Pat. No. 3,123,653. The product of the present invention is particularly adapted to be utilized as an edible casing for fresh pork sausages which must be cooked by the consumer.

As described in U.S. Pat. No. 3,123,653, exceedingly thin-walled, collagen casing material may be produced from a fluid mass of acid-swollen collagen fibrils having a solids content of the order of about 3.5 percent to 5 percent by extruding the fluid mass into a concentrated solution of ammonium sulfate which coagulates and hardens the tubular body. The hardened, tubular body is washed, tanned, and plasticized by passing it through successive liquid baths and is then dried while inflated with gas under pressure. The process described in the aforementioned patent will result in continuous lengths of a thin-walled casing that may be stuffed with pork sausage emulsion; linked on a Famco linker; and cooked by grilling, steaming, or deep-fat frying. However, the extrusion of a low solids fluid mass of collagen fibrils into a liquid coagulant bath and the subsequent handling of the extruded, tubular body as it is moved through the washing, tanning and plasticizing solutions introduces manufacturing problems of tremendous difficulty. The extrusion of such a watery low solids material produces an exceedingly fragile, tubular body which must be handled with the greatest delicacy and care during the subsequent treatments in which it is coagulated, hardened, plasticized, and dried.

The method of producing a tubular collagen casing as described in U.S. Pat. No. 3,123,653 requires four separate solution systems for treatment of the extruded material. It is a disadvantage of that method of manufacture that concentrations of each solution must be maintained at the proper level. This increases the manufacturing costs as storage tanks, pumps, piping, and instrumentation must be supplied and maintained.

It is another disadvantage of the method discussed above that manufacturing personnel are required to constantly monitor the casing as it proceeds in and out of the various solutions. Control of quality is complicated by the large number of variables, such as, solution concentration, flow rate, temperature, and treatment time. Casing may be lost due to knots, breaks, and tears resulting from the transfer of the wet, weak casing over dogets and through the solution. In addition, considerable waste of chemicals (ammonium sulfate, alum, citric acid, glycerol, carboxymethyl cellulose) occurs, and sewage disposal problems are increased.

SUMMARY OF THE INVENTION

In accordance with the present invention, much of the apparatus that is required to contain the various treating liquids and to transfer the wet casing through these liquids may be eliminated as the collagen casing is extruded directly into the atmosphere. It has now been discovered that an extruded, plasticized tube of acid-swollen collagen fibrils, while impermeable to air, is permeable to gaseous ammonia. If the collagen tube, therefore, is inflated with air as it is formed and ammonia gas is metered into the interior of the tube, the form and diameter of the tube can be maintained while neutralizing the acid present in the extrusion mass to form ammonium salts in the wall of the tube. The presence of ammonium salts in the wall of the tube does not alter the permeability of the tube to ammonia gas which may penetrate the tubular wall and neutralize the acid-swollen collagen fibrils in the exterior surface thereof. In the process of this invention, therefore, a homogeneous mass of acid-swollen collagen fibrils prepared from hide corium is extruded directly into the atmosphere. If desired, the extrusion mass may be mixed with from about 10 to 20 percent by weight, based on the hide solids, of a plasticizer or a humectant, such as, glycerin, prior to extrusion. The tube as it is formed at the time of extrusion in inflated with a gaseous mixture of air and ammonia which prevents the collapse of the tube and reacts with the acid present in the extrusion mass to form ammonium salts with deswelling of the collagen fibrils and increase in the tensile strength of the tubing. The ammonia gas permeates the wet wall of the collagen tube neutralizing the acid that is present throughout the tubular wall. If the extrusion mass contains a plasticizer, the extruded and neutralized tube may then be flattened between rollers, perforated, and taken upon a drum for later drying, or passed directly into a drying chamber in the inflated state. If the extrusion mass contains no plasticizer, the extruded tube, after neutralization of the acid present by the ammonia, is washed and passed through a liquid plasticizing bath prior to drying.

It is an advantage of the present invention, therefore, that the extruded collagen casing may be extruded more rapidly and processed more rapidly since contact with the various liquid treating media is reduced or entirely eliminated.

It is another advantage of this invention that the reagents formerly used to process the casing, i.e., ammonium sulfate, alum, and citric acid are no longer required.

It is another advantage of the present invention that better control of the process may be effected. An unexpected advantage of the process of the present invention may be due to the ammonium salts that are formed and remain in the casing. It has been noted that such casings when stuffed have improved linking characteristics in that they may be readily linked on a Famco linker with the formation of perfect "pig-tails" as contrasted with "open ends" that may sometimes occur with some types of extruded collagen casings. It is to be understood that both the foregoing general description and the following detailed description are exemplary and explanatory but are not restrictive of the invention.

For a more complete understanding of the invention, reference should be made to the acompanying drawings which illustrate a method of extruding and transporting

BRIEF DESCRIPTION OF THE DRAWING

In the drawings:

FIG. 2 is an enlarged fragmental view showing the drives;

FIG. 3 is a vertical cross section taken on lines 3—3 of FIG. 2;

FIG. 4 shows a fragmental plan section taken on lines 4—4 of FIG. 2;

FIG. 5 is a timing box diagram, and

Referring now to FIG. 1, for an understanding of the physical handling steps and the apparatus employed, a collagen extrusion mass is pumped into a rotating disk extruder 10 of the type illustrated in FIG. 1 of U.S. Pat. No. 3,122,788. The casing 12 is inflated as it is formed by air which flows under pressure from the conduit 192 through the extruder and into the interior of the tube. At the start of the process, the end of the tube is closed by folding so that the tube will contain the air and be inflated. Simultaneous with the introduction of air through the conduit 192, ammonia gas is metered into this conduit and into the interior of the extruded tube 12.

Figure 1:
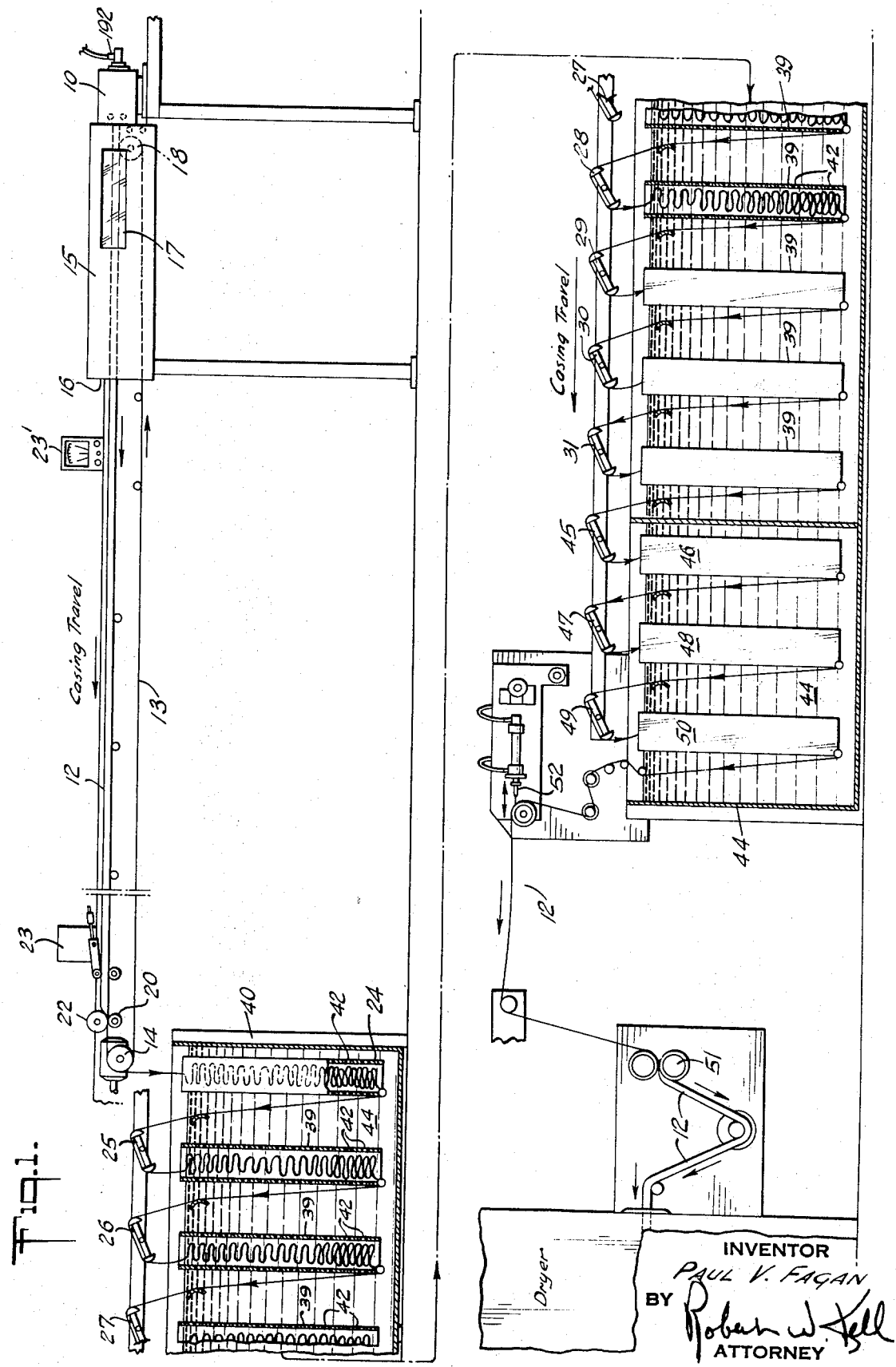
FIG. 1 is a schematic side elevation of the apparatus, partly in elevation, partly in section and broken away.
Figure 6:
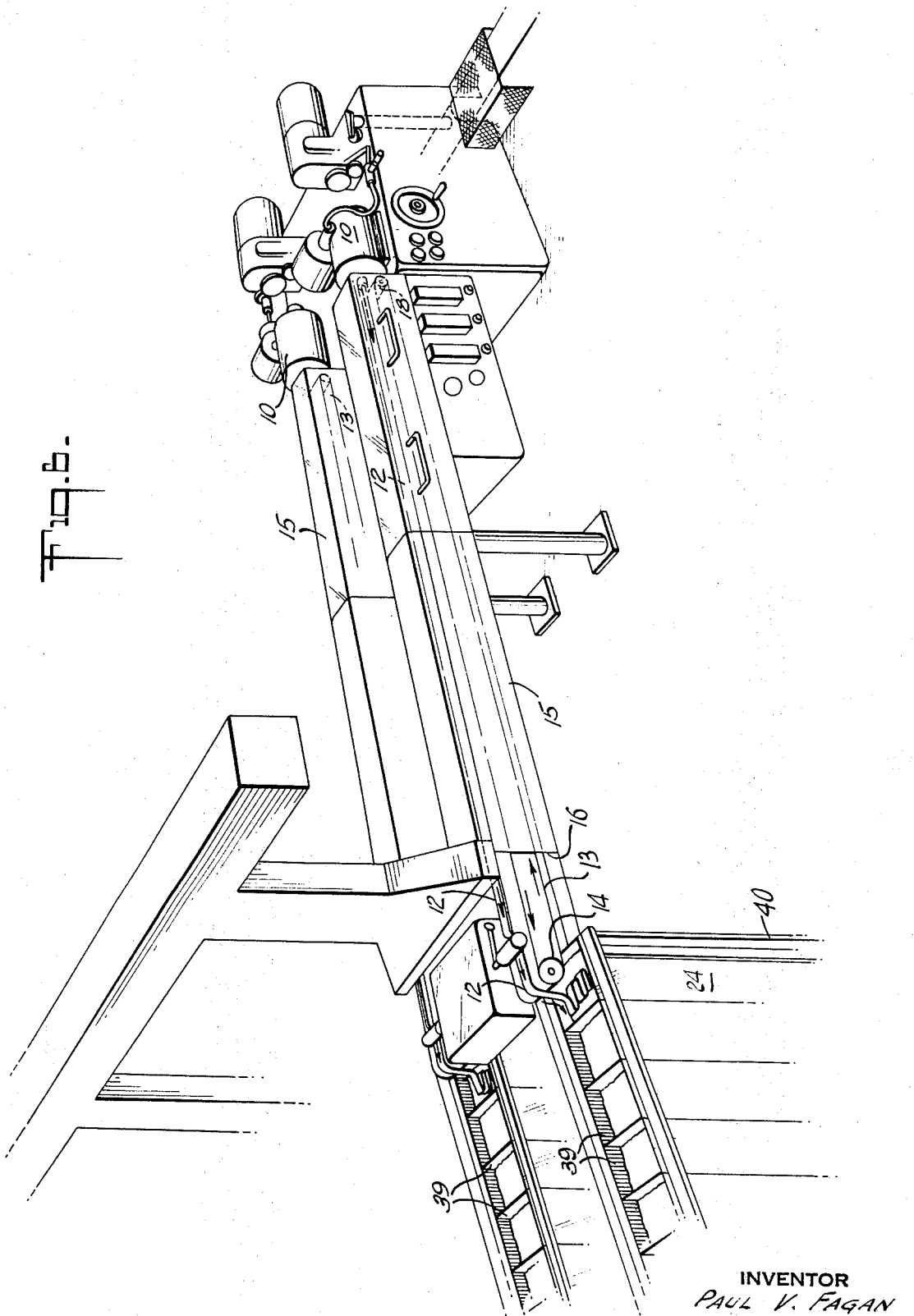
FIG. 6 is a modification showing a multiple arrangement of the apparatus.

An enclosure 15, open to the atmosphere at one end 16 surrounds the mouth of the extruder 10 and the moving extruded casing 12. The casing may be viewed while within this enclosure through the window 17. Ammonia gas is metered into the enclosure 15 to maintain an ammonia atmosphere surrounding the casing as it moves through the enclosure.

The extruded tube is supported as it moves away from the extruder on an endless belt 13, which may be made of a polyester resin, such as, Mylar, mounted on rollers 14, and 18. The roller 14 is motor driven and moves the belt in the direction of the arrow at the linear rate at which the tube 12 is extruded.

At one end of the belt 13 a pair of driven pinch rollers 20 and 22 collapse the tube and entrap an air bubble that extends within the tube 12 back to the extruder 10. As the tube is impermeable to air, the air supply through the conduit 192 is shut off when the air bubble is established within the tube. It is desirable that the tube be inflated to a diameter that is equal to the extrusion diameter and maintained at this diameter until the extruded tube has hardened. The flow of ammonia gas through the conduit 192 and into the enclosure 15 is continued at a rate that is sufficient to completely neutralize all acid present in the tube prior to deflation thereof by the rollers 20 and 22. It should be noted that the movement of the belt 13, and the pinch rollers 20 and 22, are so adjusted that the casing moves at a steady rate away from the extruder with little or no linear stretching of the casing.

A diameter gage 23 continuously monitors the diameter of the inflated casing 12 and controls the air pressure within the casing. If the diameter of the casing falls below the extrusion diameter, a signal is generated by the gage 23 which is monitored by a meter 23. If the signal varies beyond predetermined limits, it operates an air control valve (not shown) to increase the air pressure within the casing, thereby inflating the casing to its extrusion diameter.

Casing from the moving belt 13 falls into holding basket 24 within a water wash tank 40 and is conveyed through a water wash by a series of godets 25, 26, 27, 28, 29, 30 and 31. As will be apparent from FIGS. 3 and 4, each godet is driven through a spindle 32 and the bevel gears 33 and 34. The bevel gears 34 are mounted on a shaft 35 driven by the motor 36 through a belt 37 and fixed pulley 38.

Vertical plates 39 beneath each godet form compartments that retain the folded casing and prevent tangling thereof during the washing step. As will be apparent from FIG. 1, water circulating within the tank 40 passes through holes 42 in the vertical plates 39 and thoroughly washes the casing.

The washed casing from tank 40 is transferred into a plasticizer tank 44 by the godet 45, which folds the casing as it falls into the compartment 46. The folded casing is removed from the bottom of compartment 46 by the godet 47, and is transferred into the compartment 48 from whence it is removed by the godet 49. Compartments 46, 48 and 50 are constructed with openings in the vertical walls that communicate with the plasticizer solution.

The casing is removed from the plasticizing tank 44 by the motor driven godet 51 that precedes the drying apparatus. The plasticized and deflated casing, as it leaves the container 44, passes over a series of idler pulleys and is pierced at intervals of about 4 inches by a reciprocating needle 52. These small needle holes in the casing facilitate the later drying operation. Pinch roller 53 in combination with the driven roller 51 operates to seal the casing entering the dryer and permit inflation of the casing within the dryer with air.

The drying apparatus will not be described in detail as it is similar to that described and illustrated in U.S. Pat. No. 3,123,653. The drying chamber, however, is divided by partitions to form three plenum chambers, each of which may be provided with hot air at a different temperature. The casing is reinflated as it passes into the dryer for the drying and shirring operation.

Collagen compositions containing between 0.6 percent and 1.19 percent lactic acid by weight have been successfully processed by the method of the present invention, but unless the casing is washed with water following extrusion and neutralization with ammonia, it is preferable to reduce the acid concentration to the minimum that will satisfactorily swell the collagen fibrils to avoid excess ammonium lactate in the finished product. Other acids that form edible ammonium salts, such as, acetic acid or hydrochloric acid, may be substituted for lactic acid as the swelling agent.

In the following example, quantities are expressed in parts by weight unless otherwise indicated.

DESCRIPTION OF THE PREFERRED EMBODIMENT

Example I

Fresh steer hides are washed with cold water at 60° C. or less in a rotating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand, and composites are prepared from five hides. The hide composites are then cut into ½ to 4 square inch sections and reduced to pulp by three passes through a meat grinder, each pass being a finer grind. The first and second passes are through 18 and 8 millimeter holes respectively. The final grind is through holes 1.5 millimeters in diameter. It is important during the grinding process to keep the pulp below 20° C. This may be done by adding crushed ice to the hides as they are fed to the grinder.

The finely-ground hide corium is swollen with lactic acid and blended with cellulose fibers and glycerin as described in Example VII of U.S. Pat. No. 3,123,482 with the aid of a suitable homogenizer. The extrusion mass of acid-swollen collagen fibrils so obtained has the following composition:

| | Percent |
|---|---|
| Hide corium solids | 3.55 |
| Lactic acid | 0.70 |
| Cellulose | 0.71 |
| Glycerin | 1.00 |
| Water | 94.04 |

The homogenized mass is pumped from a storage vessel through a wound-wire filter having 15 to 100 mil openings and is extruded through a disk extruder of the type illustrated in FIG. 1 of U.S. Pat. No. 3,122,788. With cooling water circulating through the extruder jacket, the inner and outer disk members are rotated at 91 r.p.m., and the collagen mass is extruded at the rate of 252 grams (30 feet) per minute. The fitting on this extruder that is normally used to supply a concentrated ammonium sulfate solution to the interior of the collagen tube (conduit 190) is connected to a source of gaseous ammonia, and another conduit in communication with the interior of the extruder tube (192) is connected to a source of air pressure. The air flow is adjusted to about 1,500 cc. per minute, and the flow of ammonia gas is adjusted to about 4,000 cc. per minute. This flow of air and ammonia provides sufficient pressure to inflate the tube as it leaves the external portion of the extruder nozzle. The flow of air is decreased gradually to avoid inflating the diameter of the casing beyond the diameter at which it extruded (18 mm.) and may be shut off after a few minutes of operation when the air bubbles trapped between the extruder 10 and the pinch rolls 20 and 22 is stabilized. The flow of ammonia gas is continued at about 4,000 cc. per minute (3.4 grams of $NH_3$ per minute).

As the ammonia gas permeates the casing, immediate neutralization of the lactic acid occurs which progresses from the interior wall of the casing to the exterior wall. This is evidenced by a 5° to 6° temperature rise between the extruded tube that emerges from the nozzle and a point about 18.0 inches away from the nozzle. It is preferable to limit the maximum temperature resulting from the neutralization reaction to 34° C. by suitable means which may consist of cooling the extrusion mass as it enters the extruder increasing the rate of extrusion or decreasing the flow rate of the ammonia gas. Decreasing the ammonia to about 2.0 grams per minute will reduce the temperature rise due to neutralization, but the rate of ammonia gas flow should not be reduced to the point that the extruded casing becomes too soft to handle conveniently. Increasing the ammonia gas flow above about 3.4 grams per minute will increase the temperature of the casing due to the neutralization reaction but has little effect on the rate at which the casing is hardened.

The wet strength of the extruded casing will increase with time as the ammonia completes the neutralization process. Five to seven minutes after extrusion, the casing has a wet tensile strength of 336 to 376 grams.

The casing from the belt 13 may be inflated with air and passed directly into the first section (80 linear feet) of a drying chamber which is heated to 160° F. The dwell time of the casing in the first section of the drying chamber is approximately 2⅔ minutes. The inflated casing next enters a second section (26 linear feet) of the drying chamber which is heated to 132° F. The dwell time of the casing in the second section of the drying chamber is about one minute. The inflated casing then enters a third section (14 linear feet) of the drying chamber. The temperature in this third section is about 90° F., and the dwell time of the casing is about one-half minute. As the casing leaves the third section of the dryer, it is shirred on the apparatus described and claimed in U.S. Pat. No. 3,315,300. The shirred casing is heated in an oven from room temperature to 90° C. over a period of 12 hours and maintained at 90° C. for 12 hours.

The casing so obtained contains about 10 percent by weight (based on the collagen solids) of ammonium lactate and may be used with excellent results in the manufacture of pork sausages.

Example II

A collagen dispersion having the following composition was prepared and extruded as described in Example I above.

| | Percent |
|---|---|
| Hide | 3.55 |
| Glycerin | 0.75 |
| Cellulose | 0.71 |
| Lactic acid | 0.70 |
| Glucose | 0.01 |

The wet tensile strength at the pinch rolls 20, 22 is 280 grams. The casing from the belt 13 may be diverted to the dryer (without washing or plasticizing) and dried at a temperature of 160° F. for about 3 minutes and at 130° F. for about 2 minutes. The casing is then cured by heating to a temperature of 90° C. over a period of 8 hours and maintaining the casing at that temperature for another 12 hours.

The casing so obtained is stuffed with pork sausage to give a product that may be linked without difficulty to provide an excellent end appearance. The cooking response of the sausages so obtained is excellent.

Example III

The process of Example I is repeated substituting for the lactic acid 0.084 percent by weight hydrochloric acid to swell the collagen fibrils. The casings so obtained contained about 1 percent by weight of ammonium chloride and were suitable for use in the manufacture of pork sausages.

Example IV

*Hide preparation.*—Hides from freshly slaughtered animals are trimmed and sided. They are washed and soaked overnight in city water at 60° F. The following day they are fleshed and weighed.

To a paddle vat with a capacity of 1100 gallons is added 6364 pounds of water and 2800 pounds of the fleshed hide. Ninety-eight pounds (3.5%) of hydrated lime, 59 pounds (2.1%) of sodium sulfhydrate and 24.5 pounds (0.875%) of sodium sulfide are added to the vat and the paddle is run for one hour and stopped for one hour. The paddle is then run for five minutes out of every three hours. At the end of twenty-four hours the vat is drained and the hides are washed in city water (60° F.) for fifteen minutes, pulled and lime fleshed. The fleshed hides are returned to the paddle vat and washed clean with well water at 60° F. The washed hides are then slit on a leather slitting machine, and the corium layer is further processed to prepare the collagen for extrusion.

A large wooden drum (capacity 1444 gallons) is charged with 1158 pounds of hide corium prepared as described above. The hide is washed in the drum for nine and one-half hours at a flow rate of 13 liters (3.44 gallons) per minute. The wash water is drained from the hide corium and the washed corium is treated in the drum with 348 gallons of water containing 8.45 pounds of anhydrous citric acid and 6.68 pounds of sodium citrate dihydrate. The drum is rotated for eight hours at the end of which time the citrate solution is drained and the hides are washed for two hours in running water.

The hide corium is drummed a second time for eight hours with a solution containing 8.45 pounds of anhydrous citric acid and 6.68 pounds sodium citrate dihydrate in 348 gallons of water and finally washed with water for eight and one-half hours in the drum. The hide is shredded and ground to a particle size approximately ¼".

Example V

*Preparation of extrusion mass.*—A mixture of 72.31 pounds (23.63 pounds dry hide solids) of the ¼" ground hide particles prepared as described in Example IV above and 31.2 gallons of water at 14° C. is passed through a high speed cutting mill wherein the hide particles are shredded with rapidly rotating knives to form a hydrated mass of fibrous character.

In a stainless steel tank, 6.31 pounds of cellulose fibers are thoroughly dispersed with 48.9 gallons of water. To this cellulose dispersion is added 2.68 pounds of 37% hydrochloric acid with complete mixing. The mass of fibrous hydrated collagen from the high speed cutting mill and the acid-cellulose-water mixture are pumped at equal flow rates through a common pipeline into a storage tank. Mixing of the collagen particles and cellulose occurs as the two solutions move through the common pipeline with acid swelling of the collagen particles. After storage for a period of eighteen to twenty-four hours, the mixture of cellulose and acid swollen collagen is further dispersed with a suitable homogenizer such as a Manton-Gaulin homogenizer (Model 125–K–5BS), fitted with a two stage valve and operated with a 1500 p.s.i. drop per stage. The homogenized mixture is pumped to a storage tank and deaerated under vacuum. The extrusion mass so obtained has the following composition:

| | Percent |
|---|---|
| Hide solids | 3.55 |
| Hard wood cellulose | 0.72 |
| Hydrochloric acid | 0.12 |

Example VI

*Extrusion.*—The homogenized extrusion mass prepared as described in Example V above, is pumped from the storage vessel through a wound-wire filter having 15 x 100 mil openings and extruded through a disk extruder of the type illustrated in FIG. 1 of U.S. Pat. 3,122,788. The extruder is cooled by circulation of fluid through the jacket at 9° C. The extruded collagen casing is inflated with air and anhydrous ammonia is metered to the interior of the casing at a rate of about 1.6 grams per minute and to the exterior enclosure 15 surrounding the casing at a rate of 3.4 grams per minute. The temperature of the extruded collagen is increased due to the work performed on the extrusion mass by the rotating extruder disks and the heat of neutralization. The maximum temperature of the casing should not be permitted to exceed 34° C. The diameter guage 23 is adjusted to control the diameter of the extruded casing at 26±1 mm.

The extruded casing is flattened between the pinch rollers 20 and 22 and falls from the end of belt 13 into holding basket 24 within the water wash tank 40. The wet breaking strength of the casing as it leaves the conveyor belt is 382 grams. The casing is transferred through a series of compartments within the tank 40 by the godets 25, 26, 27, 28, 29, 30 and 31 and is subjected to intimate contact with the wash water which circulates through the openings 42 in the walls of each compartment. The total dwell time of the casing in the water wash tank 40 (see FIG. 5) is 35 minutes, and the flow rate of fresh wash water through the tank 40 is 13 liters per minute. The wet strength of the casing after water washing is 703 grams.

The plasticizer composition within the plasticizer tank 44 is an aqueous solution of 4.5% glycerin and 1.0% carboxymethyl cellulose which circulates through the tank 44 at a flow rate of 6 liters per minute. The total dwell time of the casing in the plasticizer tank 44 is 7.5 minutes. Openings in the vertical walls of the compartments 46, 48 and 50 communicate with the plasticizing solution in tank 44 and assure intimate contact of the casing with the plasticizing bath. The wet strength of the casing as it leaves the plasticizer bath is 750 grams. The casing from the plasticizing bath is dried and shirred as described in Example I above. The temperature of the first section being maintained at 178° F. and the temperature of the second and third sections being maintained at 162° F.

The shirred casing is heat cured by gradually increasing the temperature from 25° to 75° C. over a twelve hour period and holding the casing at 75° C. for an additional three hours. The cured casing is then humidified in a constant humidity room to a moisture content of about 12% to 14% which is satisfactory for fresh pork sausage casing applications.

A casing of improved strength that is sufficient to withstand the stresses of high speed frankfurter stuffing and linking equipment may be obtained by heat curing the shirred casing at a higher temperature. For example, the casing may be heated in an oven from room temperature to 90° C. over a period of twelve hours and maintained at 90° C. for an additional twelve hours prior to humidification.

Example VII

To 18.26 pounds of ground delimed hide particles (5.9 pounds dry solids prepared as described in Example IV) above, is added 7.8 gallons of water. The mixture is processed through as described in Example V above in a high speed cutting mill (Mikro-Cut; manufactured by A. Stephan and Sons; Hameln (Weser), Germany) to produce an aqueous slurry of collagen fibers. This mixture contains a total of 5.9 pounds hide corium on a dry basis.

A cellulose dispersion is prepared using 1.26 pounds of cellulose, 9.68 gallons of water and 1.32 pounds of 88% lactic acid. The blending of the cellulose-lactic acid-water dispersion with the fibrous collagen slurry is carried out as described above in Example V and the mixture is homogenized using a total pressure of 3000 p.s.i. through a two-stage homogenizing valve. The extrusion mass so obtained is extruded in accordance with the procedure described in Example VI above, the flow of anhydrous ammonia gas to the interior of the extruded casing being 3.4 grams per minute and the flow of ammonia gas to the enclosure surounding the casing being 6.8 grams per minute.

The extruded casing is processed as described in the preceding Example VI, the diameter of the casing being maintained at 26±1 mm. during the entire extrusion. The flow rate of water through the wash tank is 13 liters per minute and the total dwell time within the water washing tank is fifty minutes.

The plasticizer composition within the container 44 is similar to that employed in the preceding Example VI but contains 5 percent propylene glycol in place of the glycerine and 1 percent carboxymethyl cellulose solution (as the sodium salt). The flow rate of flesh plasticizer through the tank is 6:5 liters per minute. The total dwell time within the plasticizer tank 44 is 7.5 minutes.

The plasticized casing so obtained is dried as described in Example I, the first section of the dryer being maintained at 180° F., the second and third sections of the dryer being maintained at 162° F. The shirred casing is heat cured by gradually increasing the temperature from 25° C. to 75° C. over a twelve hour period and maintaining the casing at 75° C. for an additional three hours. The casing is then humidified to a moisture content of 12–14% and is acceptable for fresh pork sausage applications.

It should be understood that the above description has been made with reference to the preferred embodiment illustrated in the drawings and that modifications and alterations can be made therein without departing from the invention, except as expressly limited hereinafter in the claims.

What is claimed is:

1. In the manufacture of an edible collagen casing by extruding a plasticized mass of acid-swollen collagen fibrils in the form of a tube, the improvement comprising inflating the tube as it is formed at the mouth of the extruder with a gas containing ammonia, supporting the tube until the ammonia has neutralized the acid present in the extrusion mass, and the tensile strength of said tube has increased, drying the tube, and shirring the tube.

2. A process in accordance with claim 1, wherein the extrusion mass is plasticized with glycerin.

3. A process in accordance with claim 1, wherein the acid present in the extrusion mass is lactic acid.

4. A process in accordance with claim 1, wherein the acid present in the extrusion mass is hydrochloric acid.

5. A process according to claim 1, wherein said tube is inflated with a mixture of air and ammonia gas.

6. In the manufacture of an edible collagen casing by extruding a mass of acid-swollen collagen fibrils in the form of a tube; the improvement comprising inflating the tube as it is formed at the mouth of the extruder with a gas containing ammonia, supporting the tube until the ammonia has neutralized the acid present in the extrusion mass, and the tensile strength of said tube has increased, washing the tube, plasticizing the tube and drying the tube.

7. The processes of claim 6 wherein the tube is plasticized with glycerine.

8. The processes of claim 6 wherein the tube is plasticized with propylene glycol.

References Cited

UNITED STATES PATENTS

| | | | |
|---|---|---|---|
| 2,114,220 | 4/1938 | Freudenberg | 99—176 |
| 2,747,228 | 5/1956 | Brown. | |
| 3,413,129 | 11/1968 | Lieberman | 99—176 |
| 3,413,130 | 11/1968 | Rose | 99—176 |
| 3,425,846 | 2/1969 | Talty | 99—176 |
| 1,354,123 | 9/1920 | Muntz | 264—83 X |
| 3,123,653 | 3/1964 | Lieberman. | |
| 3,280,235 | 10/1966 | Dighton | 264—95 |

OTHER REFERENCES

A.D.C. Application of Wolff, Ser. No. 421,393, published May 4, 1963.

FRANK W. LUTTER, Primary Examiner

R. HALPER, Assistant Examiner

U.S. Cl. X.R.

264—209

PO-1050
(5/69)

UNITED STATES PATENT OFFICE
CERTIFICATE OF CORRECTION

Patent No. 3,535,125         Dated October 20, 1970

Inventor(s) Paul V. Fagan

It is certified that error appears in the above-identified patent and that said Letters Patent are hereby corrected as shown below:

In column 5, line 10, "15 to 100" should read --15 by 100--.
In column 8, line 18, the parentheses should end after "solids".
In column 8, line 47, delete "solution" and insert it in column 8, line 48, after "plasticizer". In column 8, line 50, "6:5" should read --6.5--. In the references, "2,747,228, Brown" should read --2,747,228, Braun--. Under Other References, "A.D.C. Application" should read --A.P.C. Application--.

SIGNED AND
SEALED
DEC 22 1970

(SEAL)
Attest:

Edward M. Fletcher, Jr.
Attesting Officer

WILLIAM E. SCHUYLER, JR.
Commissioner of Patents